Figure 1:
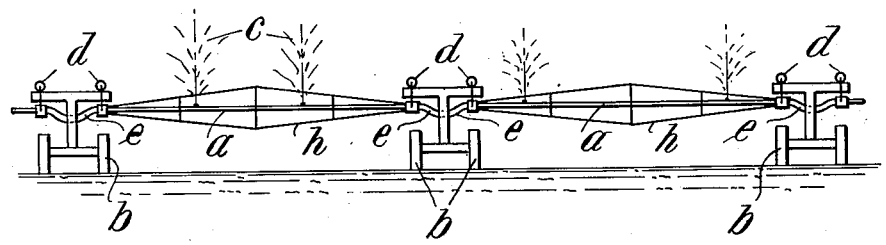

A. RAMÉN.
MOVABLE IRRIGATING APPARATUS.
APPLICATION FILED DEC. 22, 1919.

1,346,843. Patented July 20, 1920.

INVENTOR:
Arthur Ramén.
By Wm Wallace White
ATTY.

UNITED STATES PATENT OFFICE.

ARTHUR RAMÉN, OF HELSINGBORG, SWEDEN.

MOVABLE IRRIGATING APPARATUS.

1,346,843.     Specification of Letters Patent.     Patented July 20, 1920.

Application filed December 22, 1919. Serial No. 346,676.

*To all whom it may concern:*

Be it known that I, ARTHUR RAMÉN, a subject of the King of Sweden, residing at Helsingborg, Sweden, have invented new and useful Improvements in Movable Irrigating Apparatus, of which the following is a specification.

The present invention relates to improvements in irrigating apparatus, the object of the invention being to provide a distributing pipe formed of a plurality of rigid sections so connected that the individual sections are movable longitudinally and in a circumferential direction with relation to each other.

A further object of the invention is to provide an improved connecting member for the rigid pipe sections, by means of which the movements above set forth are permitted.

Figure 2:
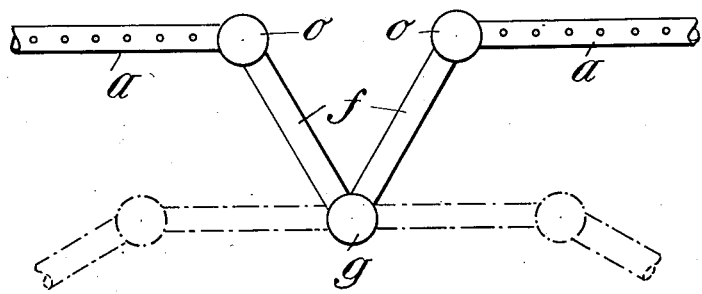

In the drawings accompanying and forming part of this specification,

Figure 1 shows diagrammatically in front elevation an irrigating system constructed in accordance with the present invention; and Fig. 2 is a plan view of a modified device for connecting the ends of the pipe sections and supporting them on their trucks.

The irrigating apparatus consists of a number of long rigid pipes or tubes $a$ (from sixteen to twenty-five meters in length) which are reinforced by rods $h$ or in any other suitable manner. Each tube rests at its respective ends upon trucks $b, b$, each truck, except the two terminal ones, thus supporting the adjacent ends of two tubes, which tubes are provided with sprayers $c$ or other outlets for the water. As shown in Fig. 1, the tube ends are supported by the trucks for instance by means of rollers $d$, mounted for rotation on a depending strap or rod and running on guides arranged transversely on the upper side of the truck frame, the lower end of the strap being so connected to a coupling member secured to the end of the pipe or tube section that the tubes are movable in the direction of their length and in a circumferential direction with relation to the truck. The ends of two adjacent tubes may be connected by hose or other flexible tube pieces $e$, permitting a certain degree of movement of the tube ends in relation to one another.

If such a truck is advanced, the adjacent ends of the tubes supported by the truck are also moved forward the same distance, the tubes having both a pivotal movement about their supporting points upon the truck and a movement in the direction of their length with relation to the trucks. When one truck has been moved, the adjacent truck is advanced in the same manner and so on, so that the whole tube system can in this manner be moved to a new part of the field for the irrigation thereof.

For supporting the tube ends by the truck, any suitable means may be used which permits of their turning end moving relatively to the truck. For instance, in place of the suspension with rollers illustrated in Fig. 1, the arrangement illustrated in Fig. 2 may be used, in which the tube ends $a$ are connected by the triple jointed coupling comprising a pair of coupling tubes $f$, which are pivotally connected at $g$, and which coupling $g$ may be secured on the truck in any suitable manner, the free ends of the coupling tubes $f$ being pivotally connected to couplings $o$, to which the ends of the rigid pipe sections $a$ are secured. In this case the parts $o, f$ and $g$ constitute both a support and a water coupling for the ends of the tubes $a$ whereby the use of hose is avoided.

Of course it is also possible to support the tube ends by solid arms arranged in the manner just described with reference to the tubes $f$ and to connect the said tube ends by hose for the passage of the water.

Having now particularly described the nature of my invention and the manner of its operation, what I claim is:

1. An irrigating apparatus, comprising a distributing pipe formed of a plurality of rigid sections, a truck between each pair of sections supporting the adjacent ends of said sections, and flexible means carried by the trucks for connecting the ends of adjacent sections to each other and to the trucks so that each of said sections is movable in the direction of its length transversely of the trucks and also in a circumferential direction with relation to the trucks.

2. An irrigating apparatus as set forth in claim 1, the flexible means comprising a triple jointed hollow member adapted to be secured to the truck at one of its joints.

In testimony whereof I have signed my name to this specification.

ARHTUR RAMÉN.